United States Patent [19]

Nevitt et al.

[11] 4,431,517

[45] Feb. 14, 1984

[54] PROCESS FOR MILD HYDROCRACKING OF HYDROCARBON FEEDS

[75] Inventors: Thomas D. Nevitt; A. Martin Tait, both of Naperville; P. Donald Hopkins, St. Charles, all of Ill.

[73] Assignee: Standard Oil Company (Indiana), Chicago, Ill.

[21] Appl. No.: 320,865

[22] Filed: Nov. 13, 1981

[51] Int. Cl.³ .................... C10G 11/05; C10G 47/20
[52] U.S. Cl. .................................. 208/111; 208/114; 208/120
[58] Field of Search ................. 208/114, 111

[56] References Cited

U.S. PATENT DOCUMENTS

| | | | |
|---|---|---|---|
| 3,169,106 | 2/1965 | Lefrancois | 208/111 |
| 3,354,096 | 11/1967 | Young | 208/111 |
| 3,493,517 | 2/1970 | Jaffe | 208/254 H |
| 3,507,778 | 4/1970 | Gladrow et al. | 208/111 |
| 3,755,150 | 8/1973 | Mickelson | 208/216 R |
| 3,761,397 | 9/1973 | Gatti | 208/143 |
| 3,778,365 | 12/1973 | Hamner et al. | 208/111 |
| 3,867,279 | 2/1975 | Young | 208/114 |
| 3,897,365 | 7/1975 | Feins et al. | 208/254 H |
| 4,326,947 | 4/1982 | Sawyer et al. | 208/111 |
| 4,327,236 | 4/1982 | Klotz | 208/111 |

Primary Examiner—Delbert E. Gantz
Assistant Examiner—O. Chaudhuri
Attorney, Agent, or Firm—James R. Henes; William T. McClain; William H. Magidson

[57] ABSTRACT

A process for mild hydrocracking of hydrocarbon feeds comprising contacting the feed with hydrogen under mild hydrocracking conditions in the presence of a catalytic composition comprising an active metallic component comprising at least one metal having hydrogenation activity and at least one oxygenated phosphorus component, and a support component comprising at least one non-zeolitic, porous refractory inorganic oxide matrix component and at least one shape selective crystalline molecular sieve zeolite component.

11 Claims, No Drawings

PROCESS FOR MILD HYDROCRACKING OF HYDROCARBON FEEDS

BACKGROUND OF THE INVENTION

This invention relates to a process for mild hydrocracking hydrocarbon feeds. According to a specific aspect of the invention, mild hydrocracking is employed to produce hydrogenated catalytic cracker feeds from distillates. According to a further aspect of the invention, mild hydrocracking is employed in preparation of dewaxed lube oil base stocks.

Mild hydrocracking of petroleum and synthetic crude oil fractions in the presence of shape selective catalysts capable of selectively cracking n-paraffins and isoparaffins is well known. For example, U.S. Pat. No. Re. 28,398 (Chen et al.,), which is a reissue of U.S. Pat. No. 3,700,585, discloses the use of shape selective crystalline aluminosilicate zeolite ZSM-5 in catalytic dewaxing processes directed at removing high freezing point paraffins from jet fuel to lower the freezing point, improving the octane rating of naphtha fractions and lowering the pour point of lube oil base stocks. According to Chen et al. the shape selective cracking ability of crystalline aluminosilicate ZSM-5 permits selective cracking of n-paraffins and certain isoparaffins without substantial cracking of desirable feed components such that improved catalytic dewaxing products are obtained under both hydrotreating and hydrocracking conditions. Chen et al. also discloses the use of crystalline aluminosilicate zeolite ZSM-5 associated with hydrogenating metals such as tungsten, vanadium, molybdenum, rhenium, nickel, cobalt, chromium, manganese, platinum or palladium, such metals being associated with the zeolite by exchange or impregnation.

An abstract of U.S. Pat. No. Re 30,529, which is a reissue of U.S. Pat. No. 4,100,056, discloses catalytic dewaxing of atmospheric and vacuum distillates in the presence of a catalyst containing mordenite in hydrogen form and a Group VI or VIII metal to obtain naphthenic lube oils of intermediate viscosity index and pour points ranging from $-50°$ to $+20°$ F.

An abstract of U.S. Pat. No. 4,222,855 discloses catalytic dewaxing of 450°–1,050° F. hydrocarbon fractions to produce high viscosity index lube oils employing a catalyst containing crystalline aluminosilicate zeolite ZSM-23 or ZSM-35, preferably in hydrogen form and associated with platinum, palladium or zinc. According to the abstract, the use of catalysts containing crystalline aluminosilicate zeolite ZSM-23 or ZSM-35 gives products of higher viscosity index and lower pour point than products obtained through the use of crystalline aluminosilicate zeolite ZSM-5.

U.S. Pat. No. 4,247,388 (Banta et al.) is directed to improving crystalline aluminosilicate zeolites such as ZSM-5 in terms of dewaxing performance by treatment to adjust alpha activity. According to the patentee, alpha-activity is adjusted by partial replacement of cationic sites of the crystalline aluminosilicate zeolite with basic cations such as sodium, by partial coking of the zeolite, by employing the zeolite in combination with an inert matrix material, by manipulating the silica to alumina ratio of the zeolite, or preferably, by steaming. Crystalline aluminosilicate zeolites adjusted in terms of alpha activity can be employed in association with exchanged or impregnated hydrogenating metals such as tungsten, vanadium, molybdenum, rhenium, nickel, cobalt, chromium, manganese, platinum or palladium.

A disclosure similar to that of Banta et al. is found in an abstract of British Pat. No. 2,027,742.

U.S. Pat. No. 4,251,348 and U.S. Pat. No. 4,282,085 (both O'Rear) are directed to processes similar to those described hereinabove wherein a low nitrogen content petroleum distillate fraction boiling from 180°–1,200° F. is contacted with crystalline aluminosilicate zeolite ZSM-5 or a similar crystalline aluminosilicate zeolite in a form substantially lacking in hydrogenation activity to form an effluent which then is fractionated into an upgraded product stream and a $C_3$–$C_4$ olefin fraction. If desired, the crystalline aluminosilicate zeolite can be dispersed in a porous matrix having only insubstantial cracking activity. Suitable matrix materials include pumice, firebrick, diatomaceous earth, alumina, silica, zirconia, titania, amorphous silica-alumina mixtures, bentonite, kaolin, silica-magnesia, silica-zirconia or silica-titania. A similar disclosure is found in an abstract of Belgium Pat. No. 877,772.

U.S. Pat. No. 4,259,174 (Chen et al.) discloses catalytic dewaxing of hydrocarbon feeds to reduce pour point and produce high viscosity index distillate lube oil stocks in the presence of a synthetic offretite crystalline aluminosilicate zeolite catalyst which may contain exchanged or impregnated hydrogenating metals such as tungsten, vanadium, molybdenum, rhenium, nickel, cobalt, chromium, manganese, platinum or palladium. The crystalline aluminosilicate zeolite may be dispersed within a matrix of alumina, silica, silica-alumina, etc. Column 5 line 67-Column 6 line 17. It is unclear whether the patentee contemplates use of the crystalline aluminosilicate zeolite in association with both hydrogenating metals and matrix materials.

An abstract of British Pat. No. 2,055,120 (Mobil) discloses a method for reclaiming or upgrading contaminated, dewaxed lube oil base stocks having a tendency to form a waxy haze during storage, comprising contacting the oil with hydrogen at 500°–675° F. and space velocity of 2–10 in the presence of a crystalline aluminosilicate zeolite having a silica to alumina ratio of at least 12 and a constraint index of 1–12.

In preparation of lube oils from waxy hydrocarbon feeds, catalytic dewaxing processes such as described hereinabove often are combined with hydrotreating, hydrocracking and/or various solvent extraction steps to obtain products having desired properties. Typically, hydrocracking and/or solvent extraction steps are conducted prior to catalytic dewaxing to remove components such as metal-containing feed components, asphaltenes and polycyclic aromatics having properties that differ grossly from those desired. In particular, solvent extraction is conducted to remove polycyclic aromatic feed components and nitrogen-containing cyclic components, removal of the latter being particularly important in order to avoid poisoning of the catalyst in catalytic dewaxing. Hydrotreating under mild or severe conditions typically follows catalytic dewaxing operations and serves to improve such lube oil properties as stability and viscosity index.

As one example of a process for producing lube oils in which a catalytic dewaxing step is included as part of a multistep process, U.S. Pat. No. 4,259,170 (Graham et al.) discloses a process that includes a combination of catalytic dewaxing and solvent dewaxing steps. According to a more specific aspect of Graham et al., the process includes a solvent extraction step prior to the dewaxing steps. As a further example of a multistep process for preparation of lube oils, Chen et al., '174, discussed hereinabove, discloses a process comprising solvent extraction followed by catalytic dewaxing. Finally, U.S. Pat. No. 4,283,272 (Garwood et al.) discloses preparation of lube oils by a process that includes hydrocracking, catalytic dewaxing and hydrotreating steps. In each of these multistep processes, the catalytic dewaxing step employs a catalyst containing a crystalline aluminosilicate zeolite, and optionally, exchanged or impregnated hydrogenating metals.

In addition to mild hydrocracking to catalytically dewax waxy hydrocarbons, mild hydrocracking can be employed to produce catalytic cracking feeds from heavy, contaminant-containing hydrocarbons such as high sulfur content gas oils and hydrotreated residual fractions. As such, mild hydrocracking can add flexibility to the combination of hydroprocessing and catalytic cracking in that yields of hydrogenated distillates and gasoline can be adjusted on the basis of demand by employing mild hydrocracking of distillates to catalytic cracking feedstocks thereby ultimately increasing gasoline yields where desired, or by conducting conventional hydroprocessing operations when increased distillate yields are desired.

It would be desirable to improve mild hydrocracking processes such as catalytic dewaxing or catalytic cracker feed hydrocracking to render such processes suitable for use with a broader range of feed materials, e.g. high sulfur or nitrogen content feeds such as those derived from low quality petroleum crude oils and synthetic hydrocarbon sources such as shale oil, tar sands oils, coal liquids and biomass liquids.

It is an object of this invention to provide an improved mild hydrocracking process. A more specific object is to provide improved dewaxing mild hydrocracking and catalytic cracking feed mild hydrocracking processes applicable with respect to a broader range of feeds. A still more specific object of the invention is to provide a single step process for production of lube oil base stocks. Other objects of the invention will be apparent to persons skilled in the art from the following description and the appended claims.

We have now found that the objects of this invention can be attained by mild hydrocracking of hydrocarbon feeds in the presence of an improved catalyst composition comprising an active metallic component comprising at least one metal having hydrogenating activity and at least one oxygenated phosphorus component, and a support component comprising a non-zeolitic, porous refractory inorganic matrix component and a shape selective zeolitic cracking component. Advantageously, mild hydrocracking with such catalysts can be conducted at conditions severe enough to allow use of feeds containing high levels of contaminants without substantial destruction of desirable feed components. In catalytic dewaxing processes, not only are waxy feed components cracked according to the present invention, but also, contaminants such as sulfur, oxygen and nitrogen are removed. In fact, according to one aspect of the invention, lube oil stocks of desirably low pour point, high viscosity index and good stability are produced from waxy petroleum or synthetic crude oil feed materials, which may contain appreciable levels of contaminants such as sulfur, nitrogen and/or oxygen, by a single step process involving catalytic dewaxing in the presence of the aforesaid catalyst. In catalytic cracking feed mild hydrocracking, desirable results are attained in terms of both cracking and hydrogenation to remove contaminants such as sulfur or nitrogen.

In connection with the present invention, it is to be noted that hydrogen processing catalysts containing a hydrogenating component comprising a chromium component, a molybdenum component and at least one Group VIII metal component, and a porous refractory inorganic oxide component and a crystalline molecular sieve zeolite component are disclosed and claimed in copending, commonly assigned application Ser. No. 200,536 of Tait et al. filed Oct. 24, 1980. Such catalysts preferably are employed for hydrodenitrogenation and hydrocracking of high nitrogen feeds. Suitable zeolites according to such earlier application include shape selective crystalline molecular sieve zeolites among others. In copending, commonly assigned application Ser. No. 231,757 of Miller filed Feb. 5, 1981, improved hydrotreating catalysts comprising a hydrogenating component comprising a chromium component, at least one additional Group VIB metal component, at least one Group VIII metal component and at least one phosphorus component supported on a refractory inorganic oxide support are disclosed and claimed as are hydrotreating processes employing such catalysts. Particularly good results are attained in denitrogenation processes according to Miller.

DESCRIPTION OF THE INVENTION

Briefly the process of this invention comprises contacting a hydrocarbon feed with hydrogen under mild hydrocracking conditions in the presence of a catalyst comprising an active metallic component comprising at least one metal having hydrogenation activity and at least one oxygenated phosphorus component, and a support component comprising at least one non-zeolitic porous refractory inorganic oxide matrix component and at least one shape selective crystalline molecular sieve zeolite component.

In greater detail, hydrocarbon feed materials employed according to the present invention are whole petroleum or synthetic crude oils, coal or biomass liquids, or fractions thereof. Substantial levels of impurities such as nitrogen, sulfur, oxygen and/or waxy components may be present in the feeds. Typical feeds contain up to about 1.5 wt% nitrogen and/or oxygen, up to about 12 wt% sulfur and/or sufficient waxy components, e.g., n-paraffins and isoparaffins, to exhibit pour points of at least about 30° F. Specific examples of useful feeds include heavy and light vacuum gas oils, atmospheric and vacuum distillates and deasphalted and hydrotreated residual fractions.

Mild hydrocracking conditions employed according to the present invention vary somewhat depending on the choice of feed as well as the type of processing to be conducted. Dewaxing mild hydrocracking conditions are employed when it is desired to reduce n-paraffin and isoparaffin content of the feed without substantial cracking of desirable aromatics, naphthenes and branched paraffins. Dewaxing mild hydrocracking conditions preferably include a temperature of about 650° to about 800° F., hydrogen pressure of about 800 to about 2500 psi, linear hourly space velocity (LHSV) of about 0.2 to about 5 and hydrogen addition rate of about 1000 to about 20,000 standard cubic feet per barrel (SCFB).

The catalytic dewaxing mild hydrocracking process according to the invention can be included as part of a multistep process for preparation of lube oils wherein catalytic dewaxing is conducted in combination with other conventional processing steps such as solvent extraction, solvent dewaxing, hydrocracking or hydrotreating to obtain lube oil base stocks of relatively low pour point and high viscosity index and stability. According to a preferred aspect of the invention, however, there is provided an improved process for preparation of lube oil base stocks of high viscosity index, low pour point and sufficiently low sulfur and/or nitrogen content to exhibit good stability consisting essentially of catalytically dewaxing a feed, and preferably a petroleum or synthetic crude oil distillate fraction having a pour point of about 50° to about 150° F. and containing up to about 5 wt% sulfur, 0.5 wt% oxygen and/or 0.5 wt% nitrogen in the presence of the aforesaid catalyst. Conditions according to this aspect of the invention typically are somewhat more severe than those in catalytic dewaxing operations conducted as part of a multistep process. Preferred conditions according to this aspect of the invention include temperature ranging from about 700° to about 800° F., hydrogen pressure of about 1200 to about 2000 psi, LHSV of about 0.2 to about 2 reciprocal hours and hydrogen addition rate of about 2000 to about 10,000 SCFB. A preferred catalyst according to this aspect of the invention is one in which the shape selective zeolitic cracking component is a crystalline borosilicate component of the AMS-1B type in hydrogen form, and the hydrogenating metal of the active metallic component comprises a molybdenum component and a nickel component.

Catalytic cracking feed mild hydrocracking conditions are employed when it is desired to remove nitrogen and/or sulfur from the feed as well as crack hydrocarbon components thereof to lower boiling components. Such conditions include temperatures ranging from about 650° to about 760° F., hydrogen pressures ranging from about 500 to about 2000 psi, LHSV ranging from about 0.2 to about 4 reciprocal hours and hydrogen addition rates ranging from about 1000 to about 20,000 SCFB. Preferred catalytic cracking feed mild hydrocracking conditions include a temperature ranging from about 690° to about 740° F., hydrogen pressure of about 800 to about 1600 psi, LHSV of about 0.5 to about 1 reciprocal hour and hydrogen addition rate of about 1000 to about 15,000 SCFB.

The process of this invention can be conducted in either fixed or expanded bed operations using a single reactor or series thereof as desired.

The catalysts employed according to the process of this invention exhibit high activity for both hydrogenation and hydrocracking as well as high degree of thermal stability under process conditions. The catalyst comprises an active metallic component comprising at least one metal having hydrogenation activity and at least one oxygenated phosphorus component, and a support component comprising at least one non-zeolitic, porous refractory inorganic oxide matrix component and at least one shape selective crystalline molecular sieve zeolite component. Content of the metallic component and the support component in the catalyst are not critical so long as the catalyst contains at least a catalytically effective amount of each. Usefully, about 5 to about 50 wt% of total catalyst weight is made up of metallic component and 50 to about 95 wt% is made up of the support component.

Useful hydrogenating metals contained in the active metallic component of the catalyst employed according to the invented process are metals of Groups VIB and VIII, specific examples of which include chromium, molybdenum, tungsten, iron, cobalt, nickel, ruthenium, rhodium, palladium, osmium, iridium and platinum. Combinations of these also can be employed if desired and often give particularly good results. These metals can be present in the active metallic component in the form of elements, as oxides or sulfides, or as combinations thereof. The oxides and sulfides are preferred in view of their greater activity in the presence of sulfur.

The active metallic component of the catalysts employed in the process of this invention also contains at least one oxygenated phosphorus component which may be present in a variety of forms such as simple oxides, phosphate anions, complex species in which phosphorus is linked through oxygen to one or more metals of the active metallic component or compounds of such metal or metals, or combinations thereof.

Content of the metal and phosphorus components of the active metallic component are not critical so long as phosphorus component content is at least effective to promote hydrogenating activity of the metal or metals of the metallic component. On the basis of total catalyst weight, hydrogenating metal makes up about 5 to about 35 wt% of the overall catalyst weight, calculated as metal oxide, e.g. $Cr_2O_3$, $MoO_3$, $WO_3$, $NiO$, $CoO$, while phosphorus component, calculated as $P_2O_5$, makes up about 0.5 to about 15 wt% of overall catalyst weight.

The support component of the catalysts employed according to this invention comprises at least one non-zeolitic porous refractory inorganic oxide matrix component and at least one shape selective crystalline molecular sieve zeolite component. Suitable non-zeolitic matrix components are well known to persons skilled in the art and include alumina, silica, zirconia, titania, magnesia, silica-alumina and various other combinations of refractory metal oxides. The matrix component also can include adjuvants such as one or more oxides of phosphorus or boron, or a halogen such as chlorine or fluorine.

The shape selective crystalline molecular sieve zeolite component of the catalyst is a zeolitic material that is derived from an acid-tolerant crystalline molecular sieve zeolite, i.e., one that retains substantial crystallinity on exposure to phosphoric acid at a pH down to about 3 to 4 and contains sufficiently low levels of metal cations capable of reacting with phosphoric acid to form insoluble metal phosphate salts capable of plugging pores of the support component as to avoid substantial plugging.

For purposes hereof, a shape selective zeolitic cracking component is defined as a crystalline molecular sieve zeolite component having substantial cracking activity with respect to n-paraffins and isoparaffins, but only insubstantial cracking activity with respect to branched paraffins having long side chains and cyclic components such as naphthenes and aromatics. Such shape selective zeolitic cracking components often are synthesized in alkali metal form, i.e., with alkali metal cations cations associated with framework metal ions. For purposes of the present invention, the zeolitic component can be employed in original form though it is preferred to employ zeolites of low alkali metal content such as those that have been converted to acid (hydrogen) or ammonium form. Metal exchanged zeolite components also are contemplated so long as the exchanged metal or metals do not form substantial levels of metal phosphates insoluble in phosphoric acid on contact therewith.

One class of crystalline molecular sieve zeolites useful as the shape selective zeolitic cracking component of the catalysts employed according to the present invention is the shape selective crystalline borosilicate zeolites of the AMS type. Such materials have the following composition in terms of mole ratios of oxides, $$0.9 \pm 0.2 \ M_{2/n}O:B_2O_3:YSiO_2:ZH_2O$$

wherein M is at least one cation having a valence of n, Y ranges from about 4 to about 600 and Z ranges from 0 to about 160, and provide an X-ray diffraction pattern comprising the following X-ray diffraction lines and assigned strengths.

| d (Å) | Assigned Strength |
|---|---|
| 11.2 ± 0.2 | W–VS |
| 10.0 ± 0.2 | W–MS |
| 5.97 ± 0.07 | W–M |
| 3.82 ± 0.05 | VS |
| 3.70 ± 0.05 | MS |
| 3.62 ± 0.05 | M–MS |
| 2.97 ± 0.02 | W–M |
| 1.99 ± 0.02 | VW–M |

Such crystalline borosilicates often are prepared by reaction of boron oxide and a silicon-containing material in a basic medium. Further details with respect to these shape selective crystalline borosilicate zeolitic cracking components are found in commonly assigned U.S. Pat. No. 4,269,813 (Klotz) which is incorporated herein by reference.

A second useful class of shape selective zeolitic cracking components useful according to the present invention are the shape selective crystalline aluminosilicate zeolites of the ZSM type. Suitable crystalline aluminosilicate zeolites of this type typically have silica to alumina mole ratios of at least about 12:1 and pore diameters of at least 5 Å. A specific example of a useful crystalline aluminosilicate zeolite of the ZSM type is crystalline aluminosilicate zeolite ZSM-5, which is described in detail in detail in U.S. Pat. No. 3,702,886. Other crystalline aluminosilicate zeolites of the ZSM-type contemplated according to the invention include crystalline aluminosilicate zeolite ZSM-11, which is described in detail in U.S. Pat. No. 3,709,979; crystalline aluminosilicate zeolite ZSM-12, which is described in detail in U.S. Pat. No. 3,832,449; crystalline aluminosilicate zeolite ZSM-35, which is described in detail in U.S. Pat. No. 4,016,245; and crystalline aluminosilicate zeolite ZSM-38, which is described in detail in U.S. Pat. No. 4,046,859. All of the aforesaid patents are incorporated herein by reference. A preferred crystalline aluminosilicate zeolite of the ZSM type is crystalline aluminosilicate zeolite ZSM-5 owing to its desirable selectivity and cracking activity.

A third class of shape selective zeolitic cracking components useful in the catalysts employed in the process of the present invention is the mordenite-type crystalline aluminosilicate-zeolites. Specific examples of these are described in detail in U.S. Pat. No. 3,247,098 (Kimberline), U.S. Pat. No. 3,281,483 (Benesi et al.) and U.S. Pat. No. 3,299,153 (Adams et al.), all of which are incorporated herein by reference. Synthetic mordenite-type zeolites such as those designated zeolon and available from Norton Company also are suitable according to the invented process.

Among the above-described shape selective zeolitic cracking components, crystalline borosilicate zeolites of the AMS type, and particularly those in acid form such as crystalline borosilicate zeolite HAMS-1B, are preferred owing to their superior cracking activity. Mordenite-type zeolites are least preferred in view of their low cracking activity.

Concentrations of the matrix and zeolite components of the support component of the catalyst employed according to the process of this invention are not critical so long as zeolite concentration is at least effective to provide cracking activity. Preferably, matrix component content is at least effective to give the support component sufficient strength and integrity that the ultimate catalyst composition can be employed in mild hydrocracking processes according to the invention without appreciable damage to the catalyst. Usefully, matrix component content ranges from about 40 to about 95 wt% of the support while zeolite content ranges from about 5 to about 60 wt% of the support component.

Preferably, the support component of the catalyst employed according to this invention is in the form of a dispersion of the zeolite component in the matrix component. Such dispersions can be prepared by well known techniques such as by blending the zeolitic component, preferably in finely divided form, into a sol, hydrosol or hydrogel of an inorganic oxide and then adding a gelling medium such as ammonium hydroxide and stirring to produce a gel. Alternately, the zeolite component is blended into a slurry of the matrix component. In either case, the result can be dried, shaped if desired, and then calcined to form the final support component. A less preferred, but still suitable, method for preparing a suitable dispersion of crystalline molecular sieve zeolite component in the matrix component is to dry-blend particles of each, preferably in finely divided form, and then conduct any desired shaping operations.

The catalysts employed according to the present invention are prepared by impregnation of a support component comprising at least one non-zeolitic porous refractory inorganic oxide matrix component and at least one acid-tolerant, shape selective crystalline molecular sieve zeolite component with precursors to the metallic component comprising at least one metal having hydrogenating activity and at least one oxygenated phosphorus component under conditions effective to avoid substantial destruction of zeolite crystallinity, followed by calcining the result to convert the precursors to the metallic component to active form. In general, the mechanics and conditions of the preparation are in accordance with well known impregnation techniques except that when a phosphorus component precursor containing or capable of liberating phosphate anions, e.g., phosphoric acid or salts thereof, is used, care must be taken to insure that the impregnation is conducted at a pH of at least about 2 in order to avoid substantial destruction of zeolite crystallinity. More preferably, pH of such impregnating solutions ranges from about 2.5 to about 6 to insure substantial retention of crystallinity as well as the desired association of the phosphorus and metal components of the active metallic component. Of course, depending on the specific zeolite employed in preparation of a given catalyst, optimum pH ranges will vary somewhat. It also is contemplated to impregnate the matrix component of the support component with precursors to the metallic component and then blend the zeolitic component with the resulting impregnation product. Accordingly, the present invention contemplates the use of catalysts in which active metallic component is deposed on a zeolite-matrix dispersion or on the matrix component.

Further details with respect to the catalysts employed according to the process of the present invention are found in application Ser. No. 320,866 of Hensley et al. filed concurrently herewith which application is incorporated herein by reference.

Catalysts according to Hensley et al. that are preferred for use in the mild hydrocracking process of the present invention are those in which the active metallic component comprises at least one metal of Group VIB or VIII, the non-zeolitic matrix component comprises alumina or silica-alumina and the shape selective crystalline molecular sieve zeolite component comprises a crystalline aluminosilicate zeolite of the ZSM type or a crystalline borosilicate zeolite of the AMS type, as these exhibit high activity for hydrogenation and cracking. More preferably, the hydrogenation metal of the active metallic component is nickel, cobalt, chromium, molybdenum or tungsten or a combination thereof and is present in an amount ranging from about 10 to about 30 wt% calculated as metal oxide and based on total catalyst weight. Preferred support compositions contain about 60 to about 90 wt% alumina or silica-alumina having dispersed therein about 10 to about 40 wt% shape selective crystalline molecular sieve zeolite.

Most preferably, the hydrogenating metal of the active metallic component of the catalyst employed according to this invention comprises a combination of nickel and molybdenum. Best results in terms of mild hydrocracking are attained using catalysts containing about 1 to about 7 wt% NiO, about 10 to about 20 wt% $MoO_3$, about 0.1 to about 5 wt% oxygenated phosphorus component, calculated as $P_2O_5$, and a support comprising about 65 to about 85 wt% alumina having dispersed therein about 15 to about 35 wt% crystalline borosilicate zeolite of the AMS type, especially HAMS-1B.

The present invention is described in further detail in connection with the following example, it being understood that the same is for purposes of illustration and not limitation.

EXAMPLE

Activity of the catalyst of Example 5 of the aforesaid application Ser. No. 320,866 of Hensley et al. filed concurrently herewith, which contained 17.70 wt% $MoO_3$, 3.44 wt% NiO and 4.35 oxygenated phosphorus component, calculated as $P_2O_5$, supported on a dispersion of 20 wt% crystalline borosilicate zeolite HAMS-1B in 80 wt% alumina, for mild hydrocracking was tested in an automated pilot plant consisting of a downflow, vertical pipe reactor of about 30" length and ⅜" inner diameter equipped with four independently wired and controlled heaters, a pressure step down and metering device for introduction of hydrogen and an outlet pressure control loop to control withdrawal of hydrogen. The catalyst of Example 5 was calcined in air at 1000° F. for about 2 hours and then screened to 14–20 mesh. The reactor was loaded to a height of twelve inches with glass balls after which about ten inches were loaded with 16 cm³ of catalyst. Glass balls were then added to fill the reactor.

The reactor was heated to 300° F. and a gaseous mixture of 8 vol% $H_2S$ in hydrogen was passed over the catalyst at 200 psi and 0.8 ft³/hr. After one hour, temperature was raised to 400° F., and after another hour, to 700° F. After one hour at 700° F., flow of the gaseous mixture was discontinued and a hydrogen flow of 12000 SCFB at 1200 psi was begun. Heavy vacuum gas oil was pumped to the reactor at 10.2 cc/hr using a positive displacement pump. After passage through the reactor, product exited the reactor through a high pressure gas-liquid separator via a valve with a control loop designed to maintain a constant liquid level in the high pressure separator. Feed properties were as follows:

| | |
|---|---|
| API Gravity (°) | 18.6 |
| Pour Point (°F.) | 110 |
| Viscosity (cst at 100° F.) | 11.68 |
| Carbon (wt %) | 84.94 |
| Hydrogen (wt %) | 11.63 |
| Nitrogen (wt %) | 0.166 |
| Sulfur (wt %) | 2.98 |
| Simulated Distillation (°F.) | |
| IBP | 409 |
| 5% | 671 |
| 10% | 727 |
| 20% | 788 |
| 40% | 863 |
| 60% | 918 |
| 80% | 977 |
| 90% | 1000+ |
| Paraffins (wt %) | 19.7 |
| Naphthenes (wt %) | 34.7 |
| Monoaromatics (wt %) | 12.6 |
| Polyaromatics and Heterocyclics (wt %) | 33.0 |

In addition to the catalyst from Example 5 of Hensley et al., comparative catalyst (A) containing 3.5 wt% NiO, 10 wt% $Cr_2O_3$, and 15 wt% $MoO_3$, supported on a dispersion of 20 wt% rare earth-exchanged, ultra-stable Y-type zeolite in 80 wt% alumina was tested. Another run was conducted using a catalyst (B) containing 20 wt% $MoO_3$, 3.5 wt% NiO and 3.0 wt% oxygenated phosphorus component, calculated, as $P_2O_5$, supported on alumina Operating conditions and results are shown in Table 1.

TABLE 1

| RUN NO./SAMPLE NO. | 1/1 | 1/2 | 1/3 |
|---|---|---|---|
| CATALYST | 5 | 5 | 5 |
| TEMP (°F.) | 700 | 740 | 740 |
| PRESSURE (psi) | 1200 | 1200 | 1200 |
| LHSV (hour$^{-1}$) | 0.625 | 0.625 | 0.625 |
| HYDROGEN (SCFB) | 12000 | 12000 | 12000 |
| HOURS ON OIL | 136 | 352 | 496 |
| API GRAVITY (°) | 28.0 | 33.6 | 32.9 |
| POUR POINT (°F.) | 80 | −70 | −60 |
| VISCOSITY (cst at 100° C.) | 4.71 | 2.51 | 2.55 |
| CARBON (wt %) | 87.00 | 86.90 | 87.05 |
| HYDROGEN (wt %) | 12.93 | 13.09 | 12.94 |
| SULFUR (ppm) | 633 | 137 | 86 |
| NITROGEN (ppm) | 135 | 8.8 | 14 |
| SIMULATED DISTILLATION (°F.) | | | |
| IBP | 114 | 0 | −15 |
| 5% | 329 | 165 | 168 |
| 20% | 631 | 427 | 448 |
| 50% | 797 | 696 | 707 |
| 80% | 907 | 860 | 863 |
| 95% | 990 | 967 | 961 |
| % DESULFURIZATION | 97.9 | 99.5 | 99.7 |
| % DENITROGENATION | 91.9 | 99.5 | 99.2 |
| HYDROGEN CONSUMED (SCFB) | 795 | 1045 | 940 |
| YIELD (wt %) | | | |
| IBP- 360° F. | 5.5 | 14.8 | 13.6 |
| 360–650° F. | 17.9 | 25.7 | 24.7 |
| 650° F.+ | 75.4 | 53.9 | 55.3 |
| RUN NO./SAMPLE NO. | 1/4 | 1/5 | 1/6 |

TABLE 1-continued

| CATALYST | 5 | 5 | 5 |
|---|---|---|---|
| TEMP (°F.) | 690 | 730 | 730 |
| PRESSURE (psi) | 1200 | 1200 | 800 |
| LHSV (hour$^{-1}$) | 0.625 | 0.625 | 0.625 |
| HYDROGEN (SCFB) | 12000 | 12000 | 12000 |
| HOURS ON OIL | 808 | 976 | 1312 |
| API GRAVITY (°F.) | 26.6 | 30.3 | 28.2 |
| POUR POINT (°F.) | 95 | 30 | 55 |
| VISCOSITY (cst at 100° C.) | 6.07 | 3.88 | 3.89 |
| CARBON (wt %) | 87.09 | 87.02 | 87.26 |
| HYDROGEN (wt %) | 12.80 | 12.96 | 12.66 |
| SULFUR (ppm) | 660 | 88 | 368 |
| NITROGEN (ppm) | 409 | 29 | 338 |
| SIMULATED DISTILLATION (°F.) | | | |
| IBP | 409 | ND* | ND |
| 5% | 584 | ND | ND |
| 20% | 716 | ND | ND |
| 50% | 830 | ND | ND |
| 80% | 928 | ND | ND |
| 95% | 999 | ND | ND |
| % DESULFURIZATION | 97.7 | 99.7 | 98.7 |
| % DENITROGENATION | 60.2 | 98.2 | 79.6 |
| HYDROGEN CONSUMED (SCFB) | 700 | 930 | 635 |
| YIELD (wt %) | | | |
| IBP-360° F. | 0 | ND | ND |
| 360-650° F. | 10.4 | ND | ND |
| 650°F.+ | 88.9 | ND | ND |

| RUN NO./SAMPLE NO. | 2/1 | 2/2 | 2/3 |
|---|---|---|---|
| CATALYST | B | B | B |
| TEMP (°F.) | 740 | 780 | 780 |
| PRESSURE (psi) | 1200 | 1200 | 1200 |
| LHSV (hour$^{-1}$) | 0.68 | 0.68 | 0.68 |
| HYDROGEN (SCFB) | 12000 | 12000 | 12000 |
| HOURS ON OIL | 128 | 320 | 488 |
| API GRAVITY (°) | ND* | 32.5 | 33.2 |
| POUR POINT (°F.) | 100 | 100 | 90 |
| VISCOSITY (cst at 100° C.) | ND | 2.10 | 2.30 |
| CARBON (wt %) | 86.78 | 86.97 | 87.06 |
| HYDROGEN (wt %) | 13.19 | 13.02 | 12.93 |
| SULFUR (ppm) | 240 | 70 | 16 |
| NITROGEN (ppm) | 22 | 3 | 1 |
| SIMULATED DISTILLATION (°F.) | | | |
| IBP | 187 | 97 | 147 |
| 5% | 343 | 244 | 267 |
| 20% | 572 | 440 | 462 |
| 50% | 769 | 656 | 678 |
| 80% | 869 | 827 | 841 |
| 95% | 985 | 931 | 941 |
| % DESULFURIZATION | 99.2 | 99.8 | 99.9 |
| % DENITROGENATION | 98.7 | 99.8 | 99.9 |
| HYDROGEN CONSUMED (SCFB) | 990 | 940 | 870 |
| YIELD (wt %) | | | |
| IBP-360°F. | 5.6 | 12.0 | 11.4 |
| 360-650° F. | 22.9 | 37.2 | 34.3 |
| 650° F.+ | 70.1 | 48.0 | 51.6 |

| RUN NO./SAMPLE NO. | 3/1 | 3/2 |
|---|---|---|
| CATALYST | A | A |
| TEMP (°F. | 740 | 780 |
| PRESSURE (psi) | 1200 | 1200 |
| LHSV (hour$^{-1}$) | 625 | 1.25 |
| HYDROGEN (SCFB) | 12000 | 12000 |
| HOURS ON OIL | 110 | 158 |
| API GRAVITY (°) | 29.7 | 30.3 |
| POUR POINT (°F.) | 105 | 100 |
| VISCOSITY (cst at 100° C.) | 3.84 | 2.98 |
| CARBON (wt %) | 87.01 | 87.16 |
| HYDROGEN (wt %) | 12.97 | 12.82 |
| SULFUR (ppm) | 102 | 79 |
| NITROGEN (ppm) | 76 | 137 |
| SIMULATED DISTILLATION (°F.) | | |
| IBP | 9 | 151 |
| 5% | 364 | 322 |
| 20% | 606 | 558 |
| 50% | 786 | 753 |
| 80% | 905 | 882 |
| 95% | 990 | 969 |
| % DESULFURIZATION | 99.7 | 99.1 |
| % DENITROGENATION | 95.3 | 91.6 |
| HYDROGEN CONSUMED (SCFB) | 825 | 890 |
| YIELD (wt %) | | |
| IBP-360° F. | 4.8 | 6.0 |
| 360-650° F. | 20.1 | 23.3 |
| 650° F.+ | 74.0 | 64.9 |

*ND stands for not determined.

As can be seen from the table, all three catalysts exhibited high desulfurization activity, and catalysts 5 and B showed good denitrogenation. Cracking activity, as indicated by the yield data was generally comparable for catalysts 5 and B, both of which were superior to catalyst A. Catalyst 5 was superior to both comparative catalysts in terms of selective cracking of waxy components as evidenced by the reductions in pour point in runs using catalyst 5. Catalyst 5 was superior in terms of overall performance in that comparable or better results were achieved with that catalyst at lower temperatures and/or pressures than those used in the comparative runs.

We claim:

1. A process for mild hydrocracking hydrocarbon feeds comprising contacting the feed with hydrogen under mild hydrocracking conditions in the presence of a catalytic composition comprising an active metallic component comprising at least one metal having hydrogenation activity and at least one oxygenated phosphorus component, and a support component comprising at least one non-zeolitic, porous refractory inorganic oxide matrix component selected from the group consisting of alumina, silica, zirconia, titania, magnesia and combinations thereof and at least one shape selective molecular sieve zeolite component, wherein the hydrocarbon feed is a petroleum or synthetic crude oil distillate having a pour point of about 50° to about 150° F. and containing up to about 5 wt% sulfur, 0.5 wt% nitrogen and 0.5 wt% oxygen.

2. The process of claim 1 wherein mild hydrocracking conditions include a temperature of about 650° to about 800° F., hydrogen pressure of about 500 to 2500 psi, LHSV of about 0.2 to about 5 reciprocal hours and hydrogen addition rate of about 1000 to about 20,000 SCFB.

3. The process of claim 2 wherein the hydrogenating metal of the active metallic component comprises a metal of Group VIB or VIII.

4. The process of claim 3 wherein the shape selective crystalline molecular sieve zeolite component comprises a crystalline borosilicate zeolite of the AMS-type or a crystalline aluminosilicate zeolite of the ZSM-type.

5. The process of claim 4 wherein the matrix component comprises alumina.

6. The process of claim 5 wherein the hydrogenating metal comprises nickel and molybdenum.

7. A process for mild hydrocracking hydrocarbon feeds comprising contacting the feed with hydrogen under mild hydrocracking conditions in the presence of a catalytic composition comprising an active metallic component comprising at lease one metal having hydrogenation activity and at least one oxygenated phosphorus component, and a support component comprising at least one non-zeolitic, porous refractory inorganic oxide matrix component and at least one shape selective crystalline molecular sieve zeolite component, wherein the shape selective crystalline molecular sieve zeolite component comprises crystalline borosilicate zeolite HAMS-1B.

8. The process of any of claims 3–7 wherein mild hydrocracking conditions are dewaxing mild hydrocracking conditions and comprise a temperature of about 650° to about 800° F., hydrogen pressure of about 800 to 2500 psi, LHSV of about 0.2 to about 5 reciprocal hours and hydrogen addition rate of about 1000 to about 20,000 SCFB.

9. The process of anyone of claims 3–7 wherein mild hydrocracking conditions are catalytic cracking feed mild hydrocracking conditions and comprise a temperature of about 650° to about 760° F., hydrogen pressure of about 500 to about 2000 psi, LHSV of about 0.2 to about 4 reciprocal hours and hydrogen addition rate of about 1000 to about 20,000 SCFB.

10. A process for producing lube oil base stock of high viscosity index, low pour point and good stability comprising contacting a hydrocarbon feed with hydrogen at about 700° to about 800° F., about 1200 to about 2000 psi hydrogen, about 0.2 to about 2 reciprocal LHSV and about 2000 to about 10,000 SCFB hydrogen in the presence of a catalyst comprising an active metallic component comprising about 1 to about 7 wt% NiO, about 10 to about 20 wt% $MoO_3$ and about 0.1 to about 5 wt% oxygenated phosphorus component, expressed as $P_2O_5$, and a support component comprising a dispersion of about 15 to about 35 wt% shape selective crystalline borosilicate zeolite of the AMS type in about 65 to about 85wt% nonzeolitic porous refractory inorganic oxide matrix component comprising alumina.

11. The process of claim 10 wherein the hydrocarbon feed is a petroleum or synthetic crude oil distillate having a pour point of about 50° to about 150° F. and containing up to about 5 wt% sulfur, 0.5 wt% nitrogen and/or 0.5 wt% oxygen.

* * * * *

UNITED STATES PATENT OFFICE
CERTIFICATE OF CORRECTION

Patent No. 4,431,517      Dated February 14, 1984

Inventor(s) NEVITT, THOMAS D.; TAIT, A. MARTIN; and HOPKINS, P. DONALD

It is certified that error appears in the above-identified patent and that said Letters Patent are hereby corrected as shown below:

Patent reads

| Col. | Line | |
|---|---|---|
| 5  | 51 | after "well as" should read --well as a-- |
| 7  | 43 | "in detail in detail" should read --in detail-- |
| 11 | 7  | "(°F)" should read --(°)-- |
| 11 | 41 | "869" should read --896-- |
| 11 | 51 | "(°F" should read --(°F)-- |
| 11 | 53 | "625" should read --.625-- |
| 12 | 41 | "500 to 2500" should read --500 to about 2500-- |
| 13 | 8  | "anyone" should read --any-- |

Signed and Sealed this

Twenty-third Day of October 1984

[SEAL]

Attest:

Attesting Officer

GERALD J. MOSSINGHOFF

Commissioner of Patents and Trademarks